United States Patent
Kano et al.

[19]

[11] Patent Number: 6,020,742
[45] Date of Patent: Feb. 1, 2000

[54] COMBUSTION MONITORING APPARATUS FOR INTERNAL COMBUSTION ENGINE

[75] Inventors: Masao Kano, Gamagoori; Tokio Kohama, Nishio; Tohru Yoshinaga, Okazaki; Hiroshi Yorita, Kariya; Yasuyuki Satou, Aichi-ken, all of Japan

[73] Assignee: Nippon Soken Inc, Nishio, Japan

[21] Appl. No.: 08/798,149

[22] Filed: Feb. 10, 1997

[30] Foreign Application Priority Data

Feb. 9, 1996 [JP] Japan ..................................... 8-047901
Oct. 21, 1996 [JP] Japan ..................................... 8-298119

[51] Int. Cl.$^7$ .............................. F20P 17/00; G01M 15/00
[52] U.S. Cl. .............................. 324/399; 324/378; 73/116
[58] Field of Search .................................... 324/380, 381, 324/388, 393, 399, 402; 123/406.14, 406.16, 406.17, 406.26, 406.34, 406.76, 435; 73/35.03, 35.06, 35.08, 116, 117.1, 117.2, 117.3

[56] References Cited

U.S. PATENT DOCUMENTS

| | | | |
|---|---|---|---|
| 4,494,924 | 1/1985 | Tanaka et al. | 431/78 |
| 4,672,324 | 6/1987 | van Kampen | 307/577 |
| 5,204,630 | 4/1993 | Seitz et al. | 318/657 |
| 5,263,452 | 11/1993 | Ohsawa et al. | 123/406.62 |
| 5,396,176 | 3/1995 | Ishii et al. | 324/388 |
| 5,687,082 | 11/1997 | Rizzoni | 73/117.3 |
| 5,769,049 | 6/1998 | Nytomt et al. | 123/435 |
| 5,777,216 | 7/1998 | Van Duyne et al. | 73/116 |
| 5,785,020 | 7/1998 | Takahashi et al. | 73/35.08 |
| 5,801,534 | 9/1998 | Hohner et al. | 324/399 |

FOREIGN PATENT DOCUMENTS

| | | |
|---|---|---|
| 58-007536 | 1/1983 | Japan . |
| 58-033026 | 2/1983 | Japan . |
| 61-089981 | 5/1986 | Japan . |
| 63-071581 | 3/1988 | Japan . |
| 5-044624 | 2/1993 | Japan . |
| 5-087036 | 4/1993 | Japan . |
| 5-149230 | 6/1993 | Japan . |
| 6-147090 | 5/1994 | Japan . |

*Primary Examiner*—Diep N. Do
*Attorney, Agent, or Firm*—Pillsbury Madison & Sutro LLP

[57] ABSTRACT

A combustion monitoring apparatus for an internal combustion engine is provided which includes a voltage supply circuit, a combustion monitoring circuit, and a control circuit. The voltage supply circuit applies the voltage to plug electrodes of a spark plug mounted in a combustion chamber of the engine. The combustion ion monitoring circuit monitors a variation in amount of combustion ions existing between the plug electrodes to determine a combustion condition of the engine based on the current flowing through the plug electrodes produced by application of the voltage to the electrodes. The control circuit controls an operation of the voltage supply circuit so that the voltage is applied across the plug electrodes prior to a discharge duration of a spark plug mounted in the combustion chamber of the engine for monitoring preignition.

7 Claims, 11 Drawing Sheets

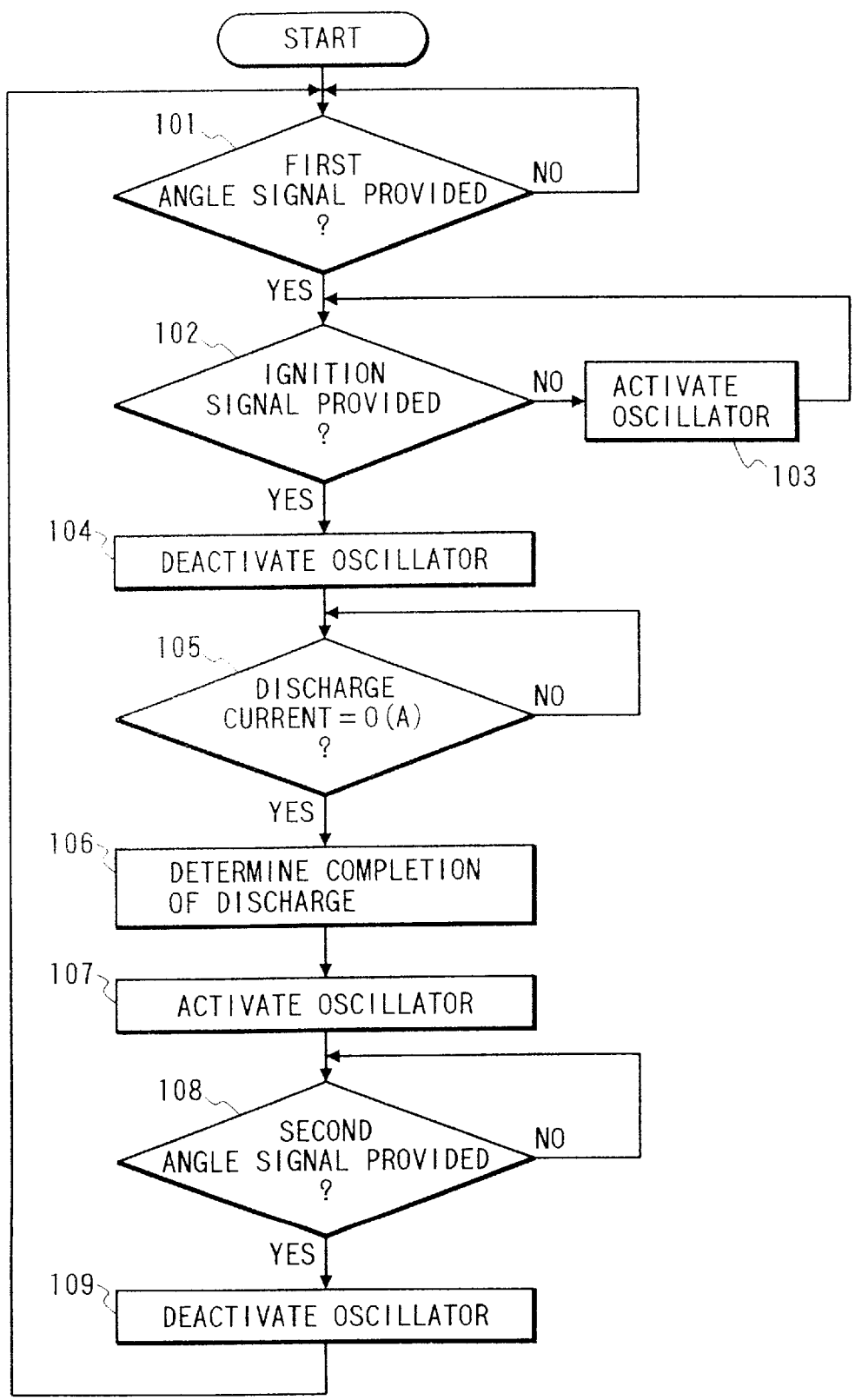

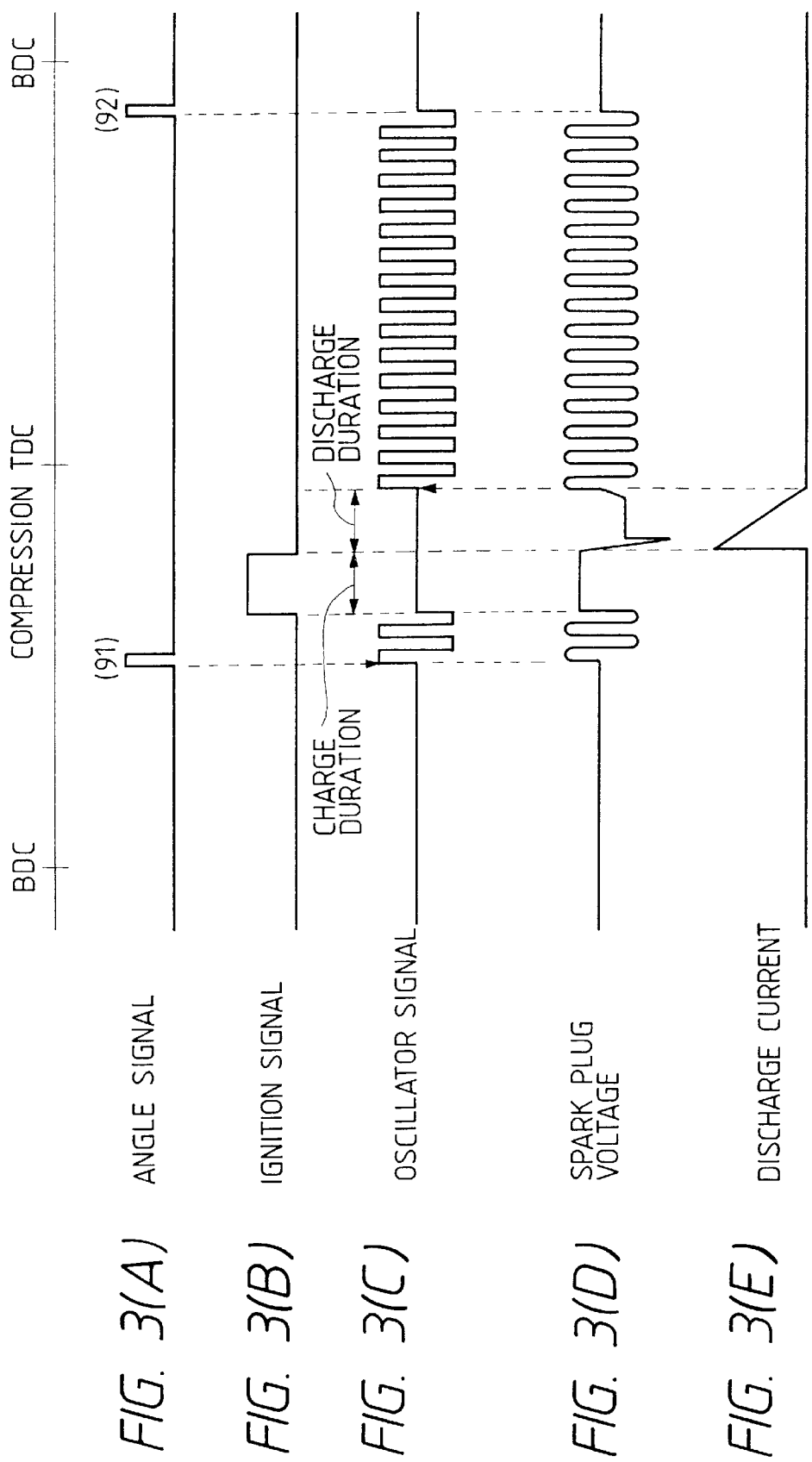

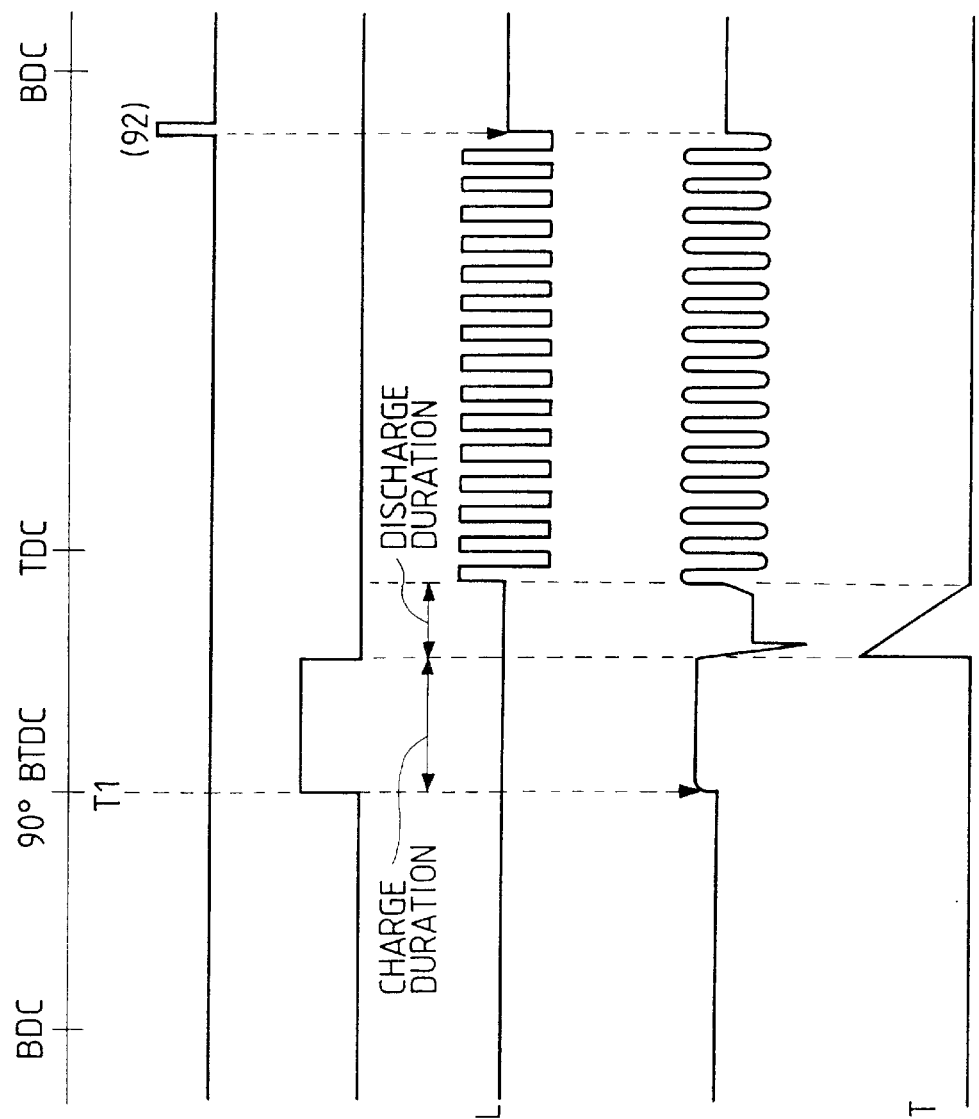

COMBUSTION MONITORING APPARATUS FOR INTERNAL COMBUSTION ENGINE

BACKGROUND OF THE INVENTION

1. Technical Field

The present invention relates generally to a combustion monitoring apparatus for internal combustion engines, and more particularly to a combustion monitoring apparatus designed to distinguish abnormal combustion from normal combustion using the combustion ion current flow resulting from motion of ions within a combustion chamber produced by combustion of an internal combustion engine.

2. Background of Related Art

In modern gasoline engines for automotive vehicles, the optimum combustion is accomplished by monitoring a combustion condition within a combustion chamber of the engine to adjust the ignition timing or air-fuel ratio under feedback control. As such feedback control, a knock control system is well known in the art which has a knocking sensor disposed on a cylinder block of the engine to detect abnormal pressure vibrations in a combustion chamber during knocking. When the combustion knock has occurred, the ignition timing is retarded to decrease a combustion temperature to prevent the combustion knock from being increased. The preignition may also damage a spark plug or a piston. It is thus proposed to detect the preignition using a knocking sensor as used in the knock control system.

Usually, the preignition is caused by two factors: a temperature rise of a spark plug due to knocking and an increase in thermal insulation of a combustion chamber due to deposit on a chamber wall. The latter however cannot be sensed by the knocking sensor and may result in the so-called runaway preignition wherein the preignition compresses combustion gas to increase the temperature and pressure within an engine cylinder so that deposit on an exhaust valve becomes a heat source to heat the exhaust valve and the top of a piston further, thereby causing ignition to be advanced to the beginning of a combustion cycle, resulting in melting of the piston and valves ultimately.

SUMMARY OF THE INVENTION

It is therefore a principal object of the present invention to avoid the disadvantages of the prior art.

It is another object of the present invention to provide a combustion monitoring apparatus designed to monitor a combustion condition within a combustion chamber of an engine prior to a spark event with high accuracy.

It is a further aspect of the invention to provide a combustion monitoring apparatus which is simple in structure and which is designed to analyze a combustion condition of an engine precisely before and after a spark event.

According to one aspect of the present invention, there is provided a combustion monitoring apparatus for an internal combustion engine which comprises: (a) a voltage supply circuit supplying a voltage to opposed electrodes disposed within a combustion chamber of the engine; (b) a combustion ion monitoring circuit monitoring a variation in amount of combustion ions existing between the opposed electrodes to determine a combustion condition of the engine based on a current flowing through the opposed electrodes produced by application of the voltage to the electrodes by the voltage supply circuit; and (c) a control circuit controlling an operation of the voltage supply circuit so that the voltage is applied across the opposed electrodes prior to a discharge duration of a spark plug mounted in the combustion chamber of the engine.

In the preferred mode of the invention, the combustion ion monitoring circuit includes an ion current monitoring circuit and a combustion condition analyzing circuit. The ion current monitoring circuit monitors a combustion ion current flowing through the opposed electrodes which changes with the variation in amount of combustion ions to provide a combustion ion signal indicative thereof. The combustion condition analyzing circuit analyzes the combustion condition of the engine based on the combustion ion signal.

The combustion condition analyzing circuit determines that preignition has occurred when the combustion ion signal exceeds a given preignition reference value.

The opposed electrodes may be plug electrodes of the spark plug. The voltage supply circuit includes an ac voltage supply circuit applying an ac voltage across the plug electrodes of the spark plug, an ignition coil applying a dc voltage across the plug electrodes during the discharge duration of the spark plug to develop a spark between the plug electrodes, and a dc voltage supply supplying a dc voltage to the ignition coil to charge the ignition coil during a charge duration proceeding the discharge duration to store electrical energy in the ignition coil used to develop the spark. The voltage supply circuit supplies the ac voltage to the plug electrodes prior to the charge duration.

The ac voltage supply circuit is actuated after the discharge duration to apply the ac voltage across the plug electrodes for analyzing the combustion condition of the engine after the spark is developed by the spark plug.

The voltage supply circuit may include an ignition coil applying a dc voltage to the plug electrodes during the discharge duration of the spark plug to develop a spark between the plug electrodes, a variable dc power supply outputting a current to charge the ignition coil prior to the discharge duration for storing electrical energy used to develop the spark between the plug electrodes, an engine speed determining circuit determining a speed of the engine, a charged current control circuit controlling the variable dc power supply so that the current outputted to the ignition coil is decreased as the speed of the engine determined by the engine speed determining circuit is decreased. The variable dc power supply starts to charge the ignition coil at a fixed crank angle of the engine.

The voltage supply circuit may include an ac voltage supply circuit applying an ac voltage across the plug electrodes. The ac voltage supply circuit is actuated after the discharge duration for analyzing the combustion condition of the engine after the spark is developed by the spark plug.

The combustion condition analyzing circuit compares a maximum value of the combustion ion signal over a given period of time following the discharge duration with a preselected reference value and determines that a complete misfire has occurred when the maximum value is smaller than the preselected reference value.

The combustion condition analyzing circuit determines a decay time required for the combustion ion signal to reach a given decay value from the end of the discharge duration and determines that a misfire caused by blowout of a flame has occurred when the decay time is smaller than a given reference time.

The combustion condition analyzing circuit also determines a decay rate at which the combustion ion signal decays after the discharge duration and determines that combustion knock has occurred when the decay rate is smaller than a given reference decay rate.

The ac voltage supply circuit includes the dc voltage supply, the ignition coil, and a switching circuit selectively establishing and blocking electric communication between the dc voltage supply and the ignition coil in a given cycle.

The ion current monitoring circuit may include a current detecting circuit detecting a current flowing through the plug electrodes and a current waveform detecting circuit detecting a variation in waveform of the current detected by the current detecting circuit caused by the variation in amount of combustion ions existing between the plug electrodes during an operation of the voltage supply circuit to provide a signal indicative of the detected variation in waveform of as the combustion ion signal.

The current waveform detecting circuit includes a current detection control circuit controlling the current detecting circuit so as to detect the current flowing through the plug electrodes in a preselected phase relation to the ac voltage to provide the detected current as the combustion ion signal.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 2 is a flowchart of a program controlling a total operation of the combustion monitoring apparatus shown in FIG. 1;

FIGS. 3(A) to 3(E) are time charts which show first and second angle signals, an ignition signal, an oscillator signal, a spark plug voltage, and a discharge current, respectively;

FIGS. 11(A) to 11(E) are time charts which show a second angle signal, an ignition signal, an oscillator signal, a spark plug voltage, and a discharge current, respectively, in the third embodiment.

DESCRIPTION OF THE PREFERRED EMBODIMENT

Figure 1:
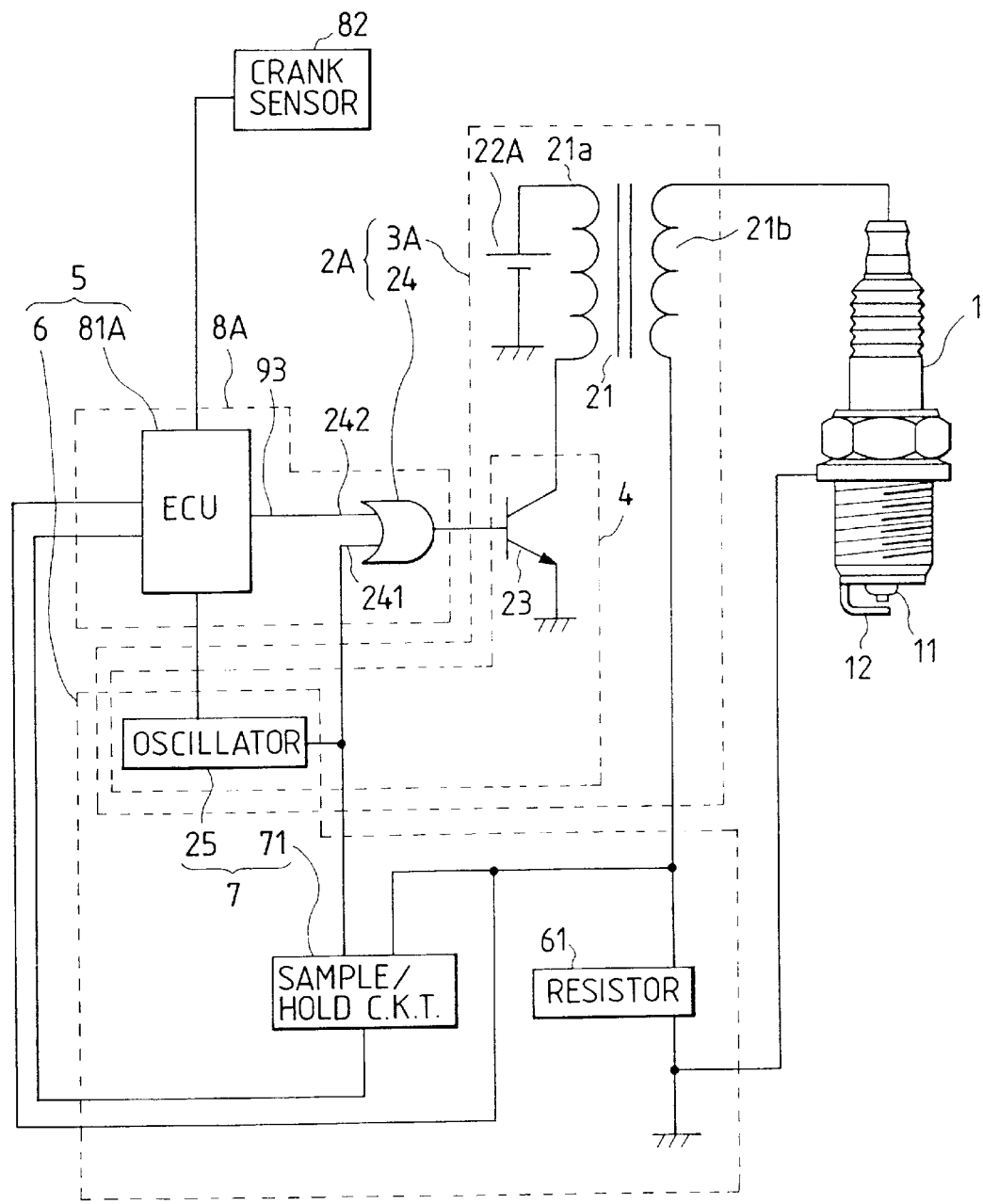
FIG. 1 is a circuit diagram which shows a combustion monitoring apparatus according to the first embodiment of the invention.

Referring now to the drawings, particularly to FIG. 1, there is shown a combustion monitoring apparatus according to the present invention which is designed to distinguish abnormal combustion conditions from a normal combustion of an internal combustion engine. The abnormal combustion conditions, as detected by the combustion monitoring apparatus of this invention, are classified into three types: one resulting from a failure in establishing an arc across plug electrodes of a spark plug (hereinafter, referred to as a complete misfire), the second being incomplete combustion wherein an arc is produced to ignite an air-fuel mixture, but a flame is quenched before the combustion is completed due to an excessive mixture richness, for example, (hereinafter, referred to as a blowout), and the third being combustion knock (also called engine knock).

The combustion monitoring apparatus includes generally a voltage supply circuit 2A, a voltage control circuit 8A, a switching circuit 4, and a combustion ion detecting circuit 5.

The voltage supply circuit 2A includes an ac voltage supply 3A and an OR gate 24. The ac voltage supply 3A includes a dc power supply or battery 22A and a transformer 21 (i.e., an ignition coil). The voltage control circuit 8A includes an electronic control unit (ECU) 81A and the OR gate 24. The switching circuit for includes a switching transistor 23 and an oscillator 25 and is designed to turning on and off the application of voltage supplied from the battery 22A to the transformer 21. The combustion ion detecting circuit 5 includes the ECU 81A and a current detecting circuit 6.

A spark plug 1 having opposed electrodes 11 and 12 is mounted in a combustion chamber of the engine. The electrode 12 is grounded through the shell of the spark plug 1. The electrode 11 is a central electrode insulated with porcelain, mica, or other materials. The transformer 21 of the voltage supply circuit 2A includes a primary winding 21a and a secondary winding 21b. The secondary winding 21b is connected to the electrode 11 of the transformer 21. The primary winding 21a is connected at one end to a positive terminal of the battery 22A and at the other end to a collector of the switching transistor 23 for selectively establishing the application of voltage to the primary winding 21a. The oscillator 25 is connected to a base of the switching transistor 23 through an input terminal 241 of the OR gate 24 and produces a rectangular signal or oscillator signal having a frequency of 30 kHz.

The ECU 81A is connected to an input terminal 242 of the OR gate 24 and the oscillator 25. The ECU 81A controls the on-off state of the oscillator 25 to control the operation of the ac voltage supply 3A and outputs an ignition signal 93 (a rectangular signal of H-level) to the input terminal 242 of the OR gate to turn on the switching transistor 23 for supplying the current stored in the battery 22A to the ignition coil 21.

The combustion ion detecting circuit 5 is operable to monitor combustion ions produced between the electrodes 11 and 12 of the spark plug 1 and includes a resistor 61 and a current wave monitor 7. The current wave monitor 7 includes the oscillator 25 and a sample and hold circuit 71. The resistor 61 is disposed between the secondary winding 21b of the transformer 21 and the electrode 12 of the spark plug 1 to detect the current flowing through the electrodes 11 and 12. The resistor 61 is also connected at a terminal leading to the secondary winding 21b with the sample and hold circuit 71 and the ECU 81A. The oscillator 25 provides a triggering signal to the sample and hold circuit 71. The sample and hold circuit 71 provides an output to the ECU 81A.

The ECU 81A is responsive to a combustion ion signal outputted from the sample and hold circuit 71 when the oscillator is in operation or another combustion ion signal outputted from the resistor 61 when the ECU 81 provides the ignition signal 93 to the OR gate 24 to determine a combustion condition of the engine. The ECU 81A also receives a sensor signal from a crank angle sensor 82 to determine the angle of a crankshaft of the engine (hereinafter, referred to as a crank angle) and measures an output from the terminal of the resistor 61 leading to the secondary winding 21b to detect the spark event.

FIG. 2 shows a flowchart of a program or sequence of logical steps performed by the ECU 81A.

Upon initiation of the program, the routine proceeds to step 101 wherein it is determined whether a first angle signal 91, as shown in FIG. 3(A), is provided or not. The first angle signal 91 is provided when a sensor signal from the crank angle sensor 82 indicates a crank angle of 90° before TDC (top dead-center) during a compression process.

If a NO answer is obtained, then the routine repeats step 101. Alternatively, if a YES answer is obtained, then the routine proceeds to step 102 wherein it is determined whether the ignition signal 93 is provided or not. If a NO answer is obtained meaning that the ignition signal 93 is not outputted form the ECU 81A, then the routine proceeds to step 103 wherein the oscillator 25 is actuated to generate an alternating signal, as shown in FIG. 3(C) (hereinafter, referred to as an oscillator signal). Input of the alternating signal from the oscillator 25 into the base of the switching transistor 23 through the OR gate 24 causes the voltage of the battery 22A to be developed across both ends of the primary winding 21a of the transformer 21 at 30 kHz, thereby resulting in electromagnetic induction to develop an alternating voltage of the same frequency as that of the oscillator signal of the oscillator 25 at the secondary winding 21b of the transformer 21 which is, in turn, applied across the electrodes 11 and 12 of the spark plug 1.

Figure 4A:
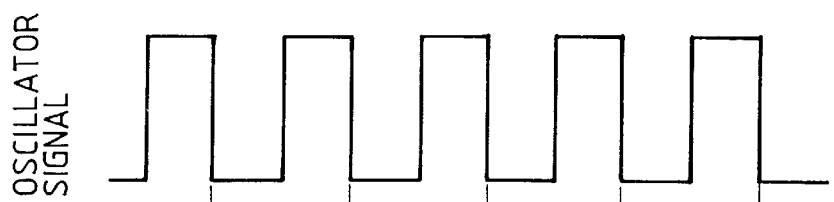
FIG. 4(A) shows a waveform of a signal outputted from an oscillator 25.
Figure 4B:
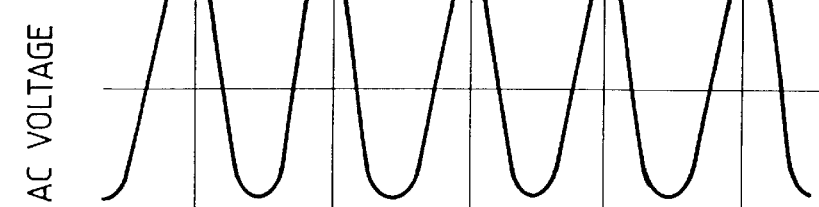
FIG. 4(B) shows a waveform of an ac voltage applied to plug electrodes of a spark plug.

FIG. 4(A) shows the oscillator signal outputted from the oscillator 25. FIG. 4(B) shows the ac voltage developed across the electrodes 11 and 12 of the spark plug 1 whose waveform is blunted as compared with the oscillator signal and which is shifted approximately 90° in phase apart from the oscillator signal due to the stray capacitance produced by a circuit extending through the switching transistor 23, the transformer 21, etc.

Figure 4C:
FIG. 4(C) shows a waveform of a capacitive current component of a current flowing through plug electrodes of a spark plug.

The ac voltage appearing across the electrodes 11 and 12 of the spark plug 1 causes the current to flow therethrough. FIG. 4(C) shows a capacitive current component of the current flowing through the electrodes 11 and 12 which is proportional to a time derivative of the ac voltage shown in FIG. 4(B). The capacitive current component becomes zero at a phase position of zero at which a change from H-level to L-level of the oscillator signal from the oscillator 25 occurs. The sample and hold circuit 71 is responsive to the change from H-level to L-level of the oscillator signal to hold an input signal, that is, the current flowing through the electrodes 11 and 12 when the capacitive current component is zero.

Figure 4D:
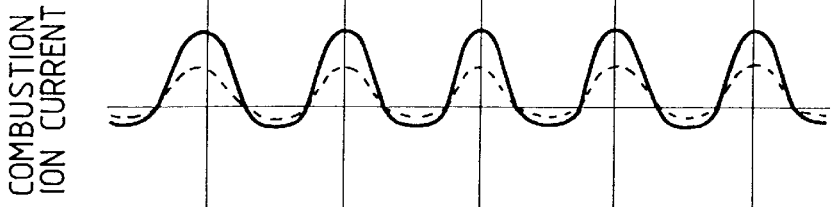
FIG. 4(D) shows waveforms of combustion ion currents when a large number of ions are produced and when a small number of ions are produced.
Figure 4E:
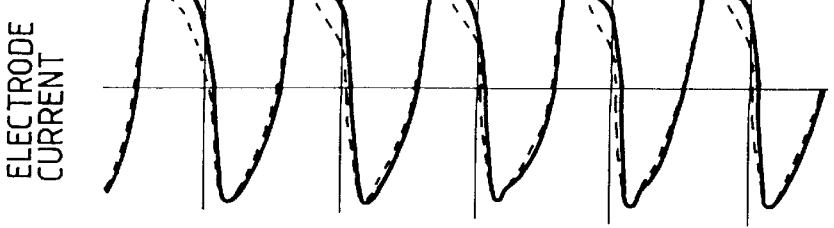
FIG. 4(E) shows waveforms of currents flowing through plug electrodes of a spark plug when a large number of ions are produced and when a small number of ions are produced.

When preignition takes place, it will cause combustion ions to be produced within a combustion chamber. The part of the combustion ions existing between the electrodes 11 and 12 produces the combustion ion current in addition to the capacitive current. FIG. 4(D) shows the combustion ion current flowing through the electrodes 11 and 12. A solid line represents the combustion ion current when a great number of ions are generated, while a broken line represents the combustion ion current when a small number of ions are generated (the same applies to subsequent drawings). The combustion ion current vibrates with amplitude proportional to the number of combustion ions in phase with the ac voltage, as shown in FIG. 4(B), applied to the electrodes 11 and 12 of the spark plug 1 and has peaks at phase positions at which the oscillator signal, as shown in FIG. 4(A), changes from H-level to L-level. The sum of the capacitive current and the combustion ion current forms a current actually flowing through the electrodes 11 and 12 which is shown in FIG. 4(E). This current has different waveforms depending upon the amount of combustion ions and is detected as a voltage drop across the resistor 61 which is proportional to the level of the current. This voltage drop is then inputted to the sample and hold circuit 71.

The sample and hold circuit 71 holds the voltage drop of the resistor 61 inputted when the oscillator signal from the oscillator is changed from the H-level to the L-level. A variation in waveform of the current shown in FIG. 4(E) with respect to time includes both a constantly periodic current variation caused by application of the ac voltage to the electrodes 11 and 12 and a current variation caused by a change in number of combustion ions. Thus, the voltage drop of the resistor 61 held by the sample and hold circuit 71 when the oscillator signal from the oscillator 25 changes from H-level to L-level indicates the change in number of combustion ions accurately. Further, a change from H-level to L-level of the oscillator signal takes place when the capacitive current is zero, and the combustion ion current shows a peak, thus allowing the variation in waveform of the current flowing through the electrodes 11 and 12 to be detected effectively. The peak of the combustion ion current held by the sample and hold circuit 71 is inputted as a combustion ion signal to the ECU 81A.

Referring back to FIG. 2, when the time to charge the transformer 21, which may be calculated back based on the set ignition timing, is reached, the ECU 81A provides the ignition signal 93 as shown in FIG. 3(B). Thus, a YES answer is obtained in step 102, and the routine proceeds to step 104 wherein the oscillator 25 is turned off as shown in FIG. 3(C). The OR gate 24 outputs a signal of H-level for the charge duration for which the ignition signal 93 is outputted, thereby causing the switching transistor 23 to be turned on so that the charge current flows from the battery 22 to the primary winding 21a of the transformer 21. This causes several hundreds volts d.c. to be developed at the secondary winding 21b of the transformer 21 which is, in turn, applied to the electrodes 11 and 12 of the spark plug 1.

When preignition occurs, it will cause the combustion ions to be produced between the electrodes 11 and 12 so that the combustion ion current flows through the electrodes 11 and 12. This causes the voltage drop to be developed across the resistor 61 which is, in turn, inputted to the ECU 81A as the combustion ion signal.

The ECU 81A determines whether the preignition has taken place or not based on the combustion ion signal inputted from the sample and hold circuit 71 prior to the charge duration (i.e., during a non-charge duration) or the combustion ion signal inputted from the resistor 61 during the charge duration. Specifically, the ECU 81A compares each of the combustion ion signals from the sample and hold circuit 71 and the resistor 61 with one of preignition reference values preselected for the charge duration and the noncharge duration. If either of the combustion ion signals is greater than corresponding one of the preignition reference values, the ECU 81A determines that the preignition has occurred. The preignition reference values should preferably be determined based on test results.

The flow of the charging current through the primary winding 21a of the transformer 21 causes electric energy to be stored in the transformer 21 for the charge duration. When the ignition signal 93 is turned off, as shown in FIG. 3(B), and an input signal to the terminal 241 of the OR gate 24 is changed from H-level to L-level, the OR gate 24 provides an output of L-level to turn off the switching transistor 23. This causes the current flow through the primary winding 21a of the transformer 21 is blocked, thereby leading to the generation of counter electromotive force at the primary winding 21a so that a high voltage of about 20 kV is developed at the secondary winding 21b which is, in turn, applied across the electrodes 11 and 12 of the spark plug 1. This establishes an arc between the electrodes 11 and 12 for igniting an air-fuel mixture injected into the combustion chamber.

The voltage drop which is proportional to a discharge current, as shown in FIG. 3(E), from the transformer 21 appears across both ends of the resistor 61 during discharge of the transformer 21. The ECU 81A is responsive to this voltage drop to detect the discharge current from the transformer 21 and determines in step 105 in FIG. 2 whether the discharge current is zero or not. If a YES answer is obtained, then it is determined in step 106 that the discharge is completed.

The ECU 81A activates the oscillator 25 again in step 107 to turn on and off the switching transistor 23 cyclically. This causes the ac voltage to be applied across the electrodes 11 and 12 of the spark plug 1 again. The resistor 61 provides a voltage drop to the sample and hold circuit 71. The sample and hold circuit 71 then outputs the peak value of the combustion ion current as the combustion ion signal to the ECU 81A.

Figure 5A:
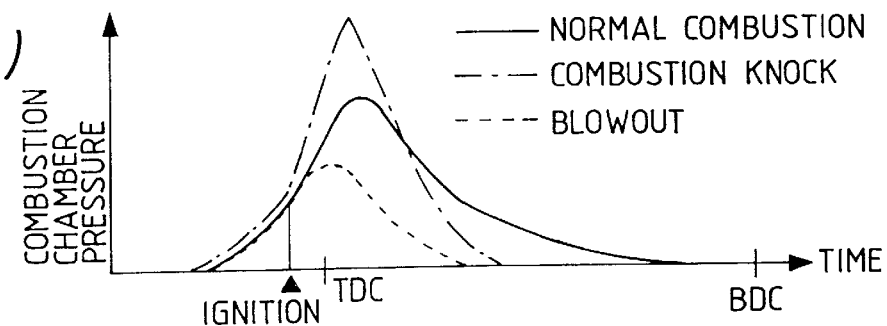
FIG. 5(A) shows variations in combustion chamber pressure during one combustion cycle.

FIG. 5(A) shows variations in combustion chamber pressure of the engine during one combustion cycle. A solid line represents normal combustion, a chain line represents abnormal combustion causing the combustion knock, and a broken line represents abnormal combustion caused by the blowout (the same applies to FIGS. 5(B) and 5(C)). In all cases, the combustion chamber pressure increases after ignition and then decreases after a maximum level is reached, however, as compared with the normal combustion, the combustion chamber pressure during the combustion knock rises rapidly until a maximum level is reached and then drops rapidly because detonation takes place during the combustion knock. In the case of the blowout, the combustion is attenuated and a flame is blown out during an expansion process, so that the combustion chamber pressure begins to decrease earlier than normal.

Figure 5B:
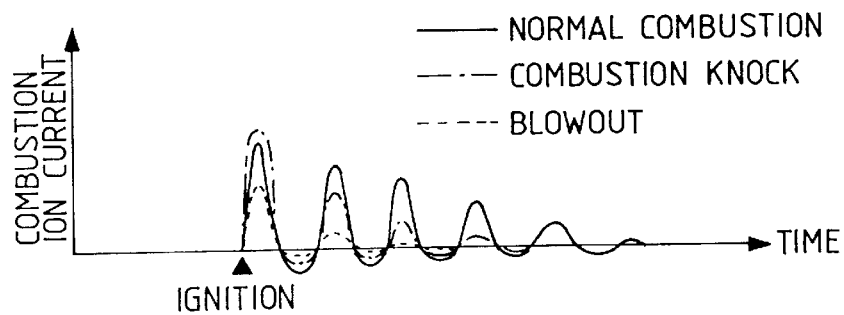
FIG. 5(B) shows variations in combustion ion current during one combustion cycle.

FIG. 5(B) shows variations in combustion ion current during the same combustion cycle as shown in FIG. 5(A) which vibrate in a cycle corresponding to the frequency of the ac voltage applied to the electrodes 11 and 12 of the park plug 1, that is, the frequency of the oscillator signal outputted from the oscillator 25.

Figure 5C:
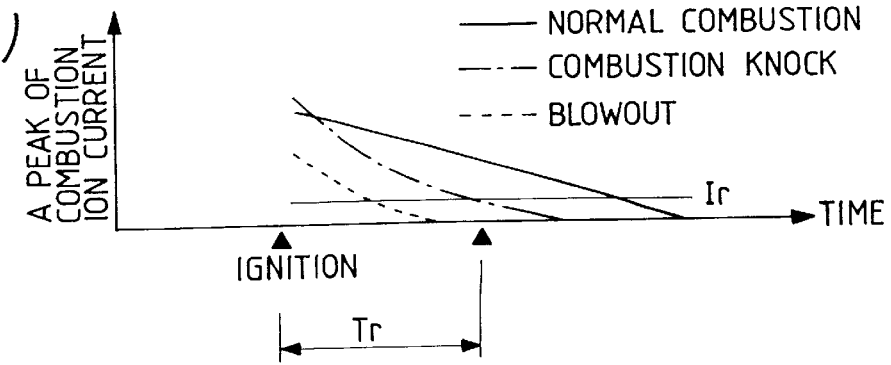
FIG. 5(C) shows variations in peak value of combustion ion currents.

FIG. 5(C) shows variations in peak value of combustion ion currents outputted from the sample and hold circuit 71, corresponding to amplitudes of the combustion ion currents as shown in FIG. 5(B), respectively. As clearly shown in the drawing, peak values of the combustion ion currents show maximum levels just after ignition, respectively, however, they are decreased with different rates. If a misfire occurs, resulting in a failure in combustion, a maximum value Ip of the variation in peak value of the combustion ion current is very small. If the blowout has taken place, the decay time TR of the variation in peak value of the combustion ion current (i.e., a combustion duration) is shorter than that in the normal combustion. If combustion knock occurs, the maximum value Ip of the variation in peak value of the combustion ion current is greater than that in the normal combustion, and the decay time TR is shorter than that in the normal combustion.

The ECU 81A monitors the variation in peak value of the combustion ion current, as discussed above, to update the maximum value Ip of the variation in peak value. When time to open exhaust valves (not shown) is reached, the ECU 81A provides a second angle signal 92, as shown in FIG. 3(A), indicating that the maximum value Ip has been determined. The routine in FIG. 2 proceeds to step 108 wherein it is determined whether the second angle signal 92 is provided or not. If a YES answer is obtained, then the routine proceeds to step 109 wherein the oscillator 25 is turned off to terminate the application of ac voltage to the electrodes 11 and 12 in this combustion cycle. The routine then returns back to step 101 to wait the first angle signal 91 in a subsequent combustion cycle.

The ECU 81A is responsive to the second angle signal 92 to determine a combustion condition based on the variation in peak value of the combustion ion current, as discussed in FIGS. 5(A) to 5(C), according to a program which will be discussed below.

Figure 6:
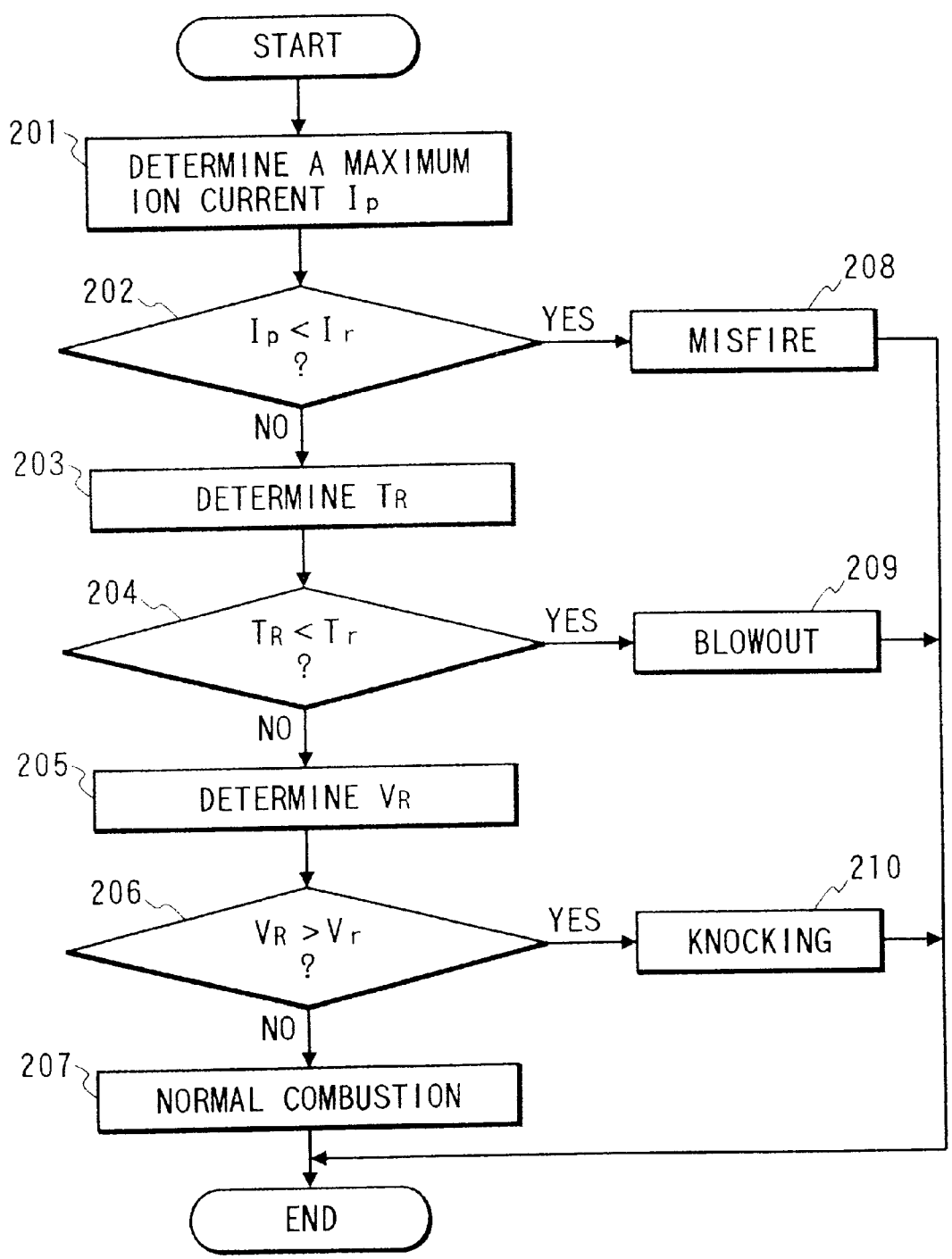
FIG. 6 is a flowchart of a program for distinguishing abnormal combustion conditions from a normal combustion condition.

FIG. 6 shows a program to determine the status of combustion of the engine executed by the ECU 81A.

First, in step 201, the maximum value Ip of a variation in peak value of the combustion ion current in one combustion cycle is determined when the exhaust valves of the engine are opened, that is, at the end of the combustion process.

The routine proceeds to step 202 wherein it is determined whether the maximum value Ip is smaller than a preselected lower limit Ir or not. If a YES answer is obtained (Ip<Ir), then the routine proceeds to step 208 wherein the complete misfire has occurred. Alternatively, if a NO answer is obtained, then the routine proceeds to step 203 wherein the decay time TR required for the maximum value Ip to decrease below the lower limit Ir is determined. The routine proceeds to step 204 wherein it is determined whether the decay time TR is smaller than a reference value Tr or not. If a YES answer is obtained (TR<Tr), then the routine proceeds to step 209 wherein it is determined that the engine is in the abnormal combustion condition caused by the blowout. Alternatively, if a NO answer is obtained, then the routine proceeds to step 205 wherein the maximum value Ip of the combustion ion current is divided by the decay time TR to determine a combustion rate VR (i.e., a combustion decay rate). The routine proceeds to step 206 wherein it is determined whether the combustion rate VR is greater than a reference value Vr or not. If a YES answer is obtained (VR>Vr), then the routine proceeds to step wherein it is determined that the engine is in the abnormal combustion condition causing the combustion knock. Alternatively, if a NO answer is obtained, then the routine proceeds to step 207 wherein it is determined that the engine is in the normal combustion condition.

As apparent from the above discussion, the combustion monitoring apparatus of this embodiment is designed to distinguish the abnormal combustion conditions based on a variation in the combustion ion current as a function of a variation in amount of combustion ions.

In the above embodiment, the dc and ac voltages are both applied across the electrodes 11 and 12 of the spark plug 1 prior to the discharge of the transformer 21, however, increasing the charge duration and decreasing the charging current supplied to the primary winding 22a of the transformer 21 allow only the dc voltage to be applied to the electrodes 11 and 12 prior to the discharge.

Figure 7:
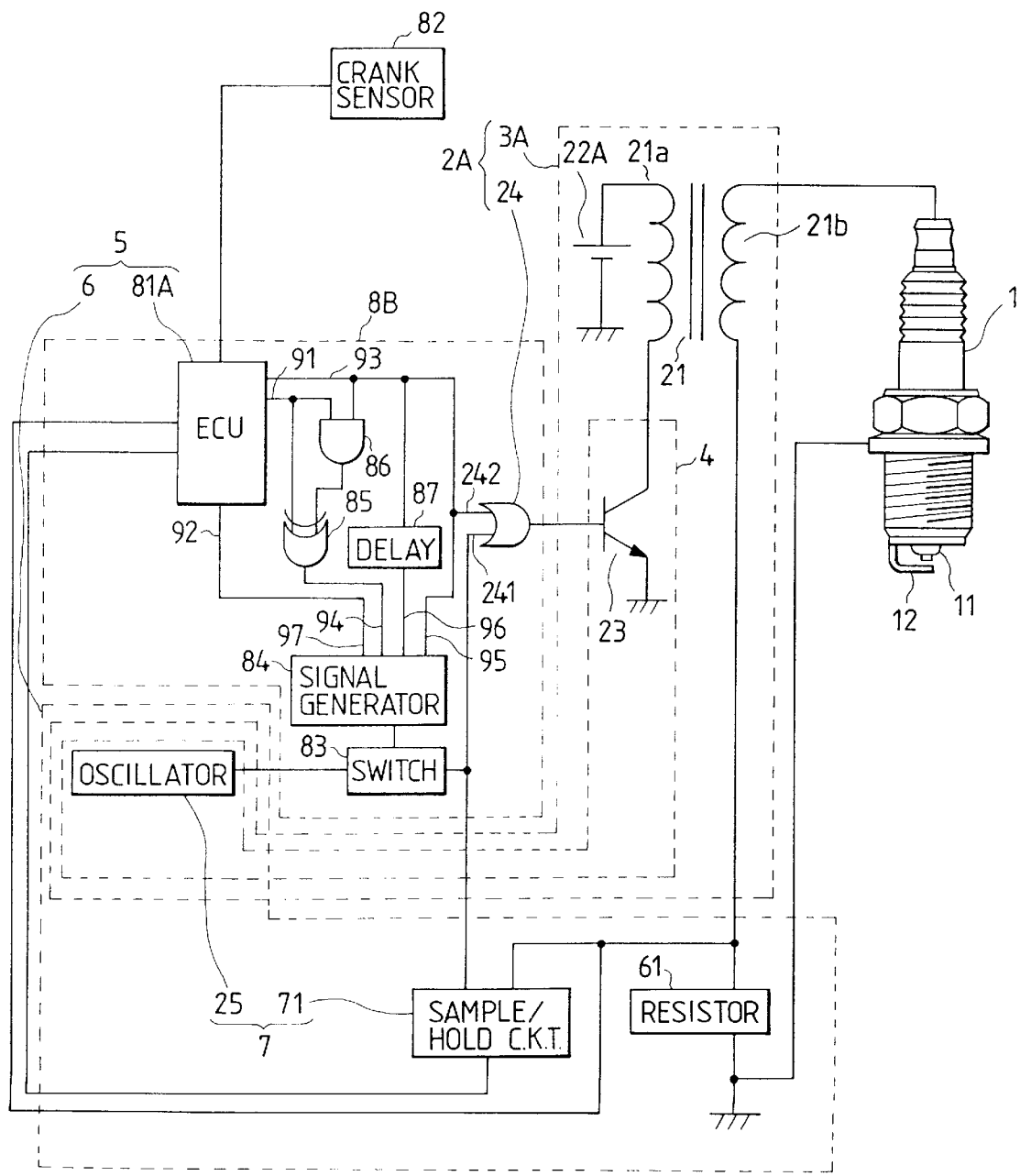
FIG. 7 is a circuit diagram which shows a combustion monitoring apparatus according to the second embodiment of the invention.

FIG. 7 shows a combustion monitoring apparatus according to the second embodiment of the invention which is different from the first embodiment shown in FIG. 1 only in structure of a voltage control circuit 8B. The same reference numbers as employed in the first embodiment refer to the same parts, and explanation thereof in detail will be omitted here.

The voltage control circuit 8B includes an ECU 81A, an exclusive-OR gate 85, an AND gate 86, a delay circuit 87, a switching circuit 83, a switching signal generator 84, and an OR gate 24.

The oscillator 25 outputs the oscillator signal at all times regardless of the operation of the ECU 81A. The switching circuit 83 is disposed between an output terminal of the oscillator 25 and an input terminal of the OR gate 24 to selectively establish and block communication between the oscillator 25 and the OR gate 24 in response to a switching signal from the switching signal generator 84.

The switching signal generator 84 has, as clearly shown in the drawing, four input terminals and one output terminal. Specifically, the switching signal generator 84 receives a first input 94, a second input 95, a third input 96, and a fourth input 97. The first input 94 is provided by the EOR gate 85 to which the first angle signal 91 outputted from the ECU 81A and an output of the AND gate 86 are inputted. To the AND gate 86, the first angle signal 91 and the ignition signal 93 are inputted. The second input 95 is the ignition signal 93. The third input 96 is a delay signal (a pulse signal of H-level) outputted from the delay circuit 87 to which the ignition switch 93 is inputted. The delay circuit 87 is responsive to interruption of output of the ignition switch 93 to provide the delay signal to the switching signal generator 84 after a lapse of a discharge duration of the spark plug 1. The fourth input 97 is the second angle signal 92 outputted from the ECU 81A. The switching signal generator 84 is responsive to the first and third inputs 94 and 96 of H-level to output a switching command signal to the switching circuit 83, while it arrests the output of the switching command signal when the second and fourth inputs 95 and 97 change to H-level.

Figure 8:
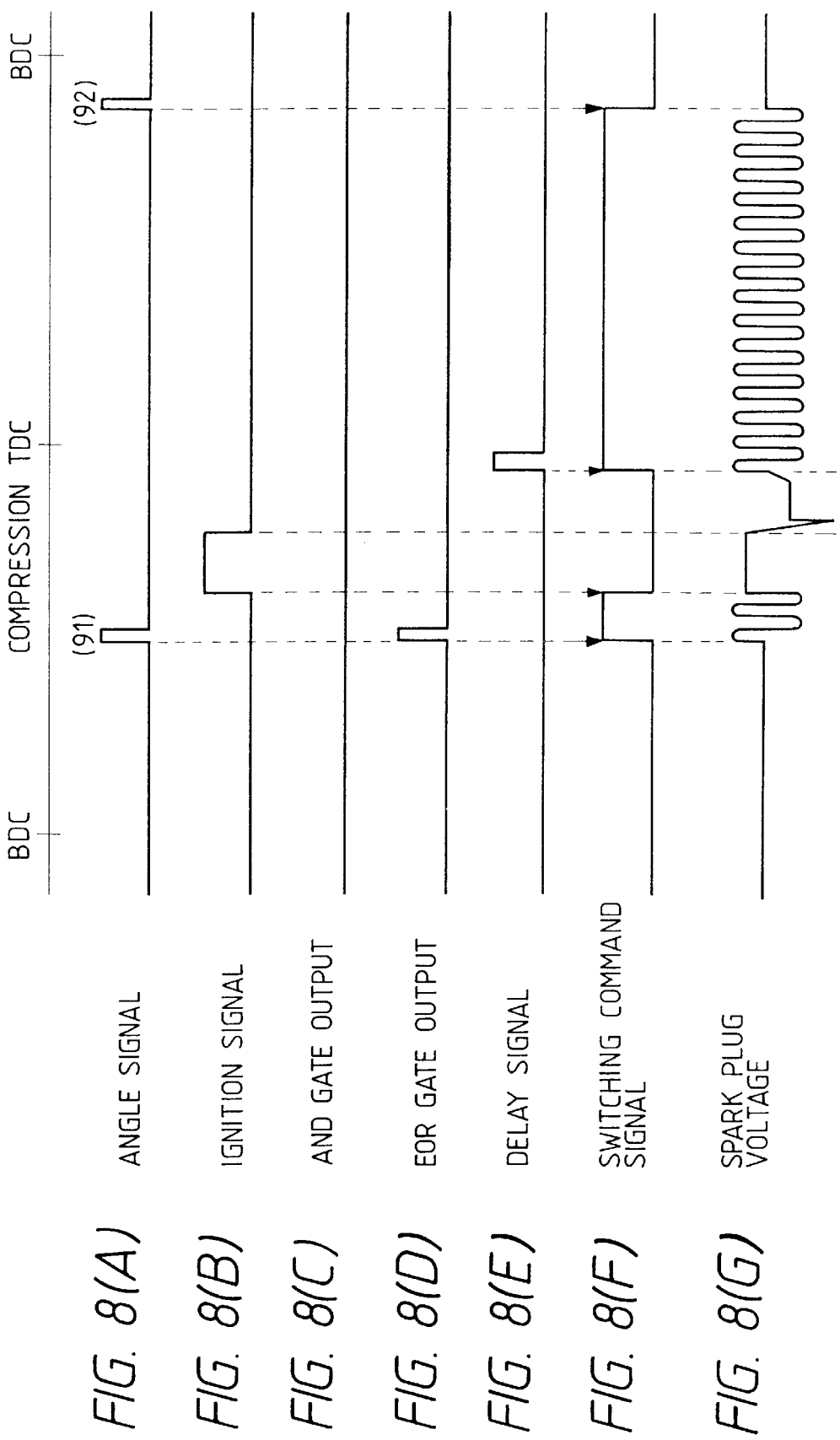
FIGS. 8(A) to 8(G) are time charts which show first and second angle signals, an ignition signal, an output from an AND gate, an output from an exclusive-OR gate, a delay signal, a switching command signal, and a spark plug voltage, respectively, in the second embodiment.

In operation, when the first angle signal 91 is outputted from the ECU 81A prior to output of the ignition signal 93 as shown in FIGS. 8(A) and 8(B), the AND gate 86 provides an output of L-level to the exclusive-OR gate 85. The exclusive-OR gate 85 is responsive to the output of L-level from the AND gate 86 and the first angle signal 91 to provide as the first input 94 an output of H-level to the switching signal generator 84. The switching signal generator 84 thus outputs the switching command signal, as shown in FIG. 8(F), to the switching circuit 83. The switching circuit 83 establishes the communication between the oscillator 25 and the OR gate 24 to provide the oscillator signal to the base of the switching transistor 23 through the OR gate 24 so that the switching transistor 23 turns on and off the supply of dc voltage from the battery 22A to the transformer 21 cyclically. This causes the ac voltage to be developed across the electrodes 11 and 12 of the spark plug 1 as shown in FIG. 8(G).

Subsequently, when the ignition signal 93, as shown in FIG. 8(B), is provided as the second input 95 to the switching signal generator 84, it will cause the switching signal generator 84 to stop outputting the switching command signal to block the communication between the oscillator 25 and the OR gate 24, thereby arresting the output of the oscillator signal to the OR gate 24. The ignition signal 93 is, as shown in FIG. 8(B), maintained outputted for a given charge time. The switching transistor 23 is responsive to the ignition signal 93 to continue to be turned on, thereby causing the transformer 21 to be charged so that several hundreds volts d.c. is developed at the secondary winding 21b of the transformer 21 which is, in turn, applied across the electrodes 11 and 12 of the spark plug 1.

When the ignition switch 93 is stopped from being outputted, the switching transistor 23 is turned off, so that an arc is developed between the electrodes 11 and 12 of the spark plug 1. Additionally, the delay circuit 85 outputs, as shown in FIG. 8(E), the delay signal to the switching signal generator 84 as the third input 96 after a lapse of a delay time. The switching signal generator 84 outputs the switching command signal to the switching circuit 83 again. The delay time is determined so as to correspond to the discharge duration of the spark plug 1 as preselected in design; therefore, the communication between the oscillator 25 and the OR gate 24 is established again after the spark event, thereby causing the ac voltage to be applied across the electrodes 11 and 12 of the spark plug 1 as shown in FIG. 8(G).

When an crank angle derived by an output of the crank angle sensor 82 shows an angular position at which exhaust valves (not shown) of the engine are to be opened, the ECU 81A outputs the second angle signal 92 as shown in FIG. 8(A). The switching signal generator 84 is responsive to the second angle signal 92 (the fourth input 97) to stop outputting the switching command signal to the switching circuit 83, thereby blocking the communication between the oscillator 25 and the OR gate 24 to stop the supply of ac voltage to the electrodes 11 and 12 of the spark plug 1.

As described above, the ac voltage is applied to the electrodes 11 and 12 of the spark plug 1 before the charge duration and after the discharge duration, while the dc voltage is applied during the charge duration. This allows the ECU 81A to monitor the combustion ions existing between the electrodes 11 and 12 of the spark plug 1 to detect the preignition before the discharge duration and the blowout or combustion knock after the discharge duration.

Figure 9:
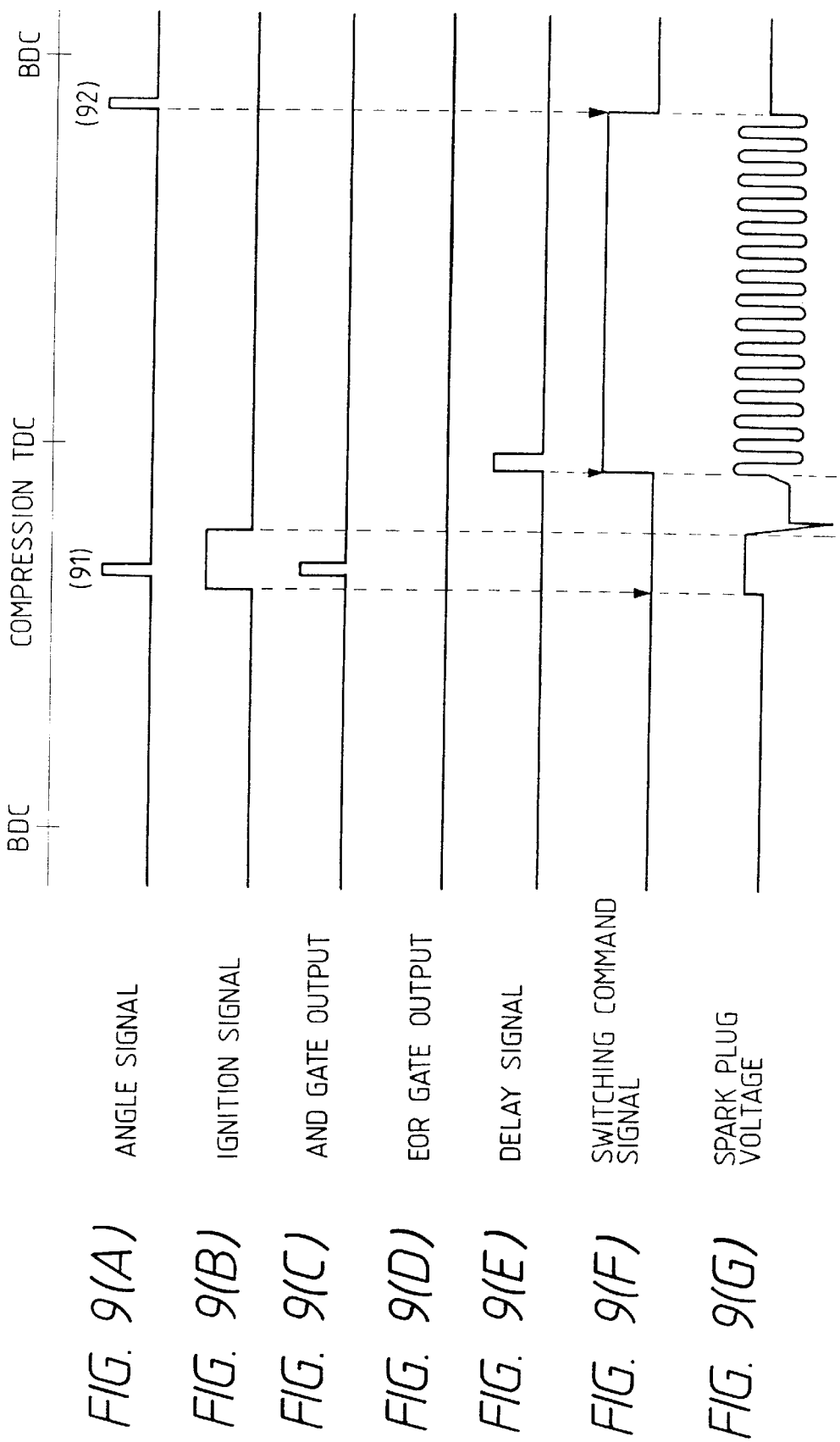
FIGS. 9(A) to 9(G) are time charts which show first and second angle signals, an ignition signal, an output from an AND gate, an output from an exclusive-OR gate, a delay signal, a switching command signal, and a spark plug voltage, respectively, when the first angle signal is outputted while the ignition signal is being outputted.

If the first angle signal 91 is outputted from the ECU 81A while the ignition signal 93 is being outputted as shown in FIGS. 9(A) and 9(B), it will cause the output from the AND gate 86 to show H-level as shown in FIG. 9(C), so that the first input 94 of the switching signal generator 84, that is, the output from the exclusive-OR gate 85 is maintained at L-level as shown in FIG. 9(D). The switching signal generator 84 thus provides no switching command signal as shown in FIG. 9(F). The switching circuit 83 continues to block the communication between the oscillator 25 and the OR gate 24 to stop the supply of ac voltage to the electrodes 11 and 12 of the spark plug 1 until the discharge duration expires as shown in FIG. 9(G).

A triggering signal for the sample and hold circuit 71 may be derived directly from the oscillator 25 to operate the sample and hold circuit 71 at all the time for providing the combustion ion signals based on outputs from the sample and hold circuit 71 prior to the charge duration, during the charge duration, and after the discharge duration.

Figure 10:
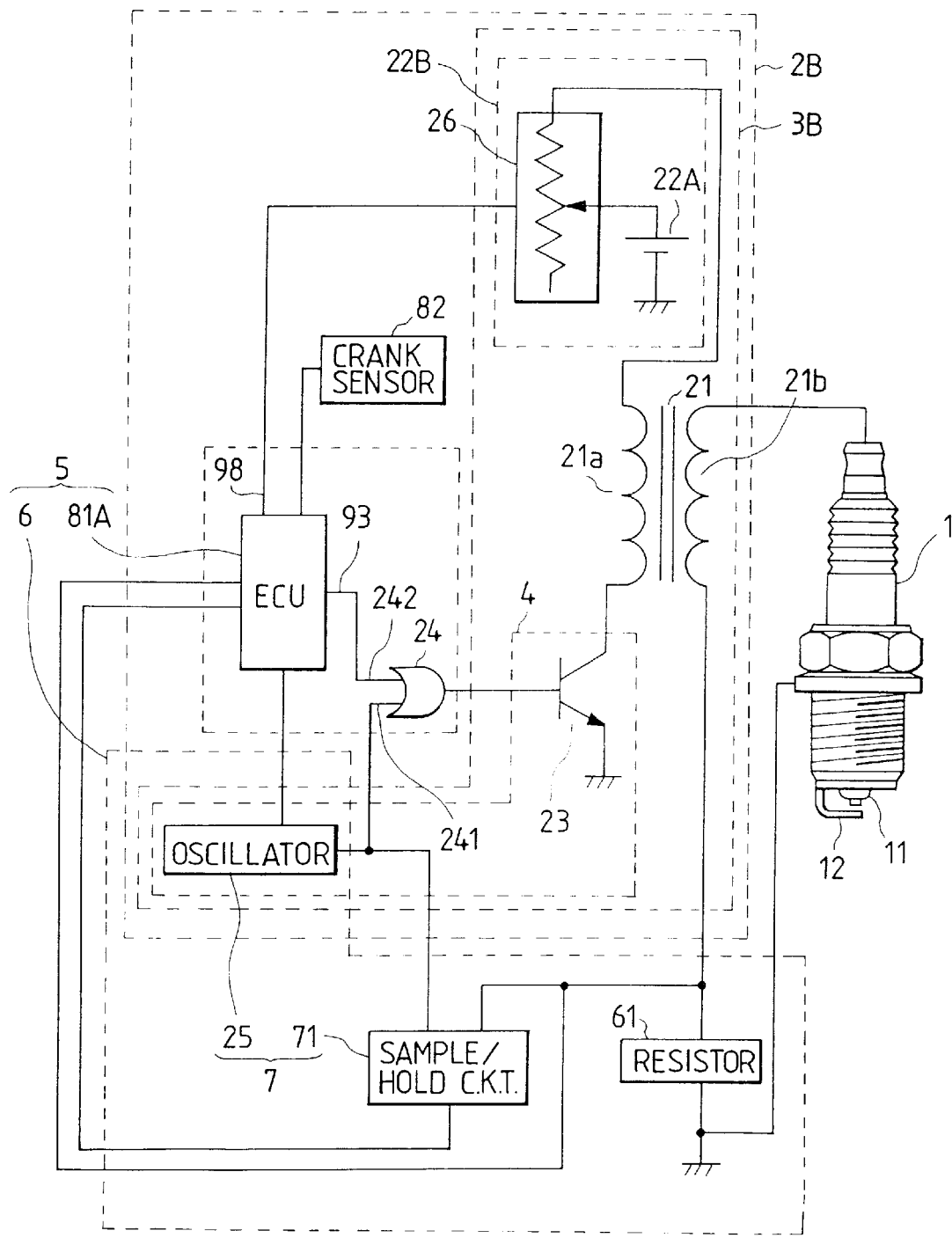
FIG. 10 is a circuit diagram which shows a combustion monitoring apparatus according to the third embodiment of the invention.

FIG. 10 shows a combustion monitoring apparatus according to the third embodiment of the invention which is different from the first embodiment shown in FIG. 1 only in that a voltage supply circuit 2B is used instead of the voltage supply circuit 2A. Other arrangements are identical, and explanation thereof in detail will be omitted here.

The voltage supply circuit 2B includes a dc voltage source 22B having a variable resistor 26 connected to an output of the battery 22A in series with the battery 22A and the primary winding 21a of the transformer 21. The variable resistor 26 is responsive to a resistance control signal 98 outputted from the ECU 81A to adjust the resistance thereof. The change in resistance of the variable resistor 26 will cause a charge current outputted to the primary winding 21a of the transformer 21 to be changed.

The ECU 81A is similar in operation to the one shown in FIG. 1, however, designed to determine the speed of the engine based on an output from the crank angle sensor 82.

In operation, when a crank angle which is monitored by the crank angle sensor 82 reaches an angular position T1 of 90° before TDC during a compression process, the ECU 81A outputs the ignition signal 93 as shown in FIG. 11(B). During the charge duration for which the ignition signal 93 is provided, an output of the OR gate 24 is maintained at H-level, thereby turning on the switching transistor 23, so that the current is supplied from the battery 22 to the primary winding 21a of the transformer 21. This will cause several hundreds volts d.c. to be developed at the secondary winding 21b of the transformer 21 which is, in turn, applied across the electrodes 11 and 12 of the spark plug 1 as shown in FIG. 11(D). Upon the development of the dc voltage across the electrodes 11 and 12, the combustion ion current produced by the combustion ions existing between the electrodes 11 and 12 flows through the electrodes 11 and 12 until the discharge or spark event is initiated, thereby causing the resistor 61 provide a voltage drop.

Since the speed of the engine is usually changing at all times, the length of time from T1 to ignition is changed. For example, it is increased as the speed of the engine is decreased. When the speed of the engine determined using an output from the crank angle sensor 82 is smaller than a given reference value, the ECU 81A increases the resistance of the variable resistor 26, thereby causing the current supplied from the battery 22 to the primary winding 21a of the transformer 21 to be decreased. This avoids overcharge of the transformer 21 even when the charge duration is prolonged, thereby developing optimum sparks across the electrodes 11 and 12 at all times, thus preventing the spark plug 1 from being deteriorated.

When the ignition is completed so that the current discharged from the transformer 21 becomes zero as shown in FIG. 11(E), the ECU 81A actuates the oscillator 25 again similar to the first embodiment to turn on and off the switching transistor 23 cyclically for developing the ac voltage across the electrodes 11 and 12 of the spark plug 1.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, additional opposed electrodes may be disposed within a combustion chamber apart from the electrodes 11 and 12 of the spark plug 1 for monitoring the combustion ion current. In this case, it is desirable that the ac voltage be applied across the opposed electrodes before and after the charge duration.

The operating time of the apparatus ranges from the angular position T1 advanced 90° from TDC to the time to open the exhaust valves, however, the invention is not limited to the same. For example, it is desirable that the combustion ion current be monitored over a range where preignition or combustion knock would occur.

The current wave monitor 7 includes, as discussed above, the sample and hold circuit 71 and the oscillator 25 providing the oscillator signals to determine the frequency of the ac voltage applied to the spark plug 1, however, it may be designed to detect a phase of the current flowing through the electrodes 11 and 12 at which a voltage drop of the resistor 61 reaches a given value (e.g., 0) in each cycle of the ac voltage for determining a variation in waveform of the current based on a variation of the detected phase.

The preignition is monitored by the ECU 81A, however, may be determined using a circuitry consisting of a peak hold monitor detecting a voltage drop of the resistor 61 and a comparator comparing an output of the peak hold monitor with a preignition reference voltage. The abnormal combustion conditions such as blowout and combustion knock may also be monitored by a known electronic circuit.

When it is required to monitor the preignition only, the ac voltage needs not be applied to the electrodes 11 and 12 of the spark plug 1 after the discharge duration. In this case, the oscillator 25 and the OR gate 24 used in the third embodiment for applying the ac voltage to the electrodes 11 and 12 may be omitted.

The sample and hold circuit 71 is designed to hold a voltage drop of the resistor 61 in response to a change of the oscillator signal from H-level to L-level, however, the voltage drop of the resistor 61 may alternatively be held upon a change of the oscillator signal from L-level to H-level for determining a maximum level of the combustion ion current. When it is not necessary to detect the maximum level of the combustion ion current, the voltage drop of the resistor 61 may be held at another phase angle of the oscillator signal.

What is claimed is:

1. A combustion monitoring apparatus for an internal combustion engine comprising:

a voltage supply circuit supplying a voltage to opposed electrodes disposed within a combustion chamber of the engine;

a combustion ion monitoring circuit monitoring a variation in amount of combustion ions existing between the opposed electrodes to determine a combustion condition of the engine based on a current flowing through the opposed electrodes produced by application of the voltage to the electrodes by said voltage supply circuit; wherein said combustion ion monitoring circuit includes an ion current monitoring circuit and a combustion condition analyzing circuit, said ion current monitoring circuit monitoring a combustion ion current flowing through the opposed electrodes which changes with the variation in amount of combustion ions to provide a combustion ion signal indicative thereof, said combustion condition analyzing circuit analyzing the combustion condition of the engine based on the combustion ion signal;

wherein said combustion condition analyzing circuit determines that preignition has occurred when the combustion ion signal exceeds a given preignition reference value; and a control circuit controlling an operation of said voltage supply circuit so that the voltage is applied across the opposed electrodes prior to a discharge duration of a spark plug mounted in the combustion chamber of the engine;

wherein the opposed electrodes are plug electrodes of the spark plug, and wherein said voltage supply circuit includes an ignition coil applying a dc voltage to the plug electrodes during the discharge duration of the spark plug to develop a spark between the plug electrodes, a variable dc power supply outputting a current to charge the ignition coil prior to the discharge duration for storing electrical energy used to develop the spark between the plug electrodes, an engine speed determining circuit determining a speed of the engine, a charged current control circuit controlling the variable dc power supply so that the current outputted to the ignition coil is decreased as the speed of the engine determined by said engine speed determining circuit is decreased, the variable dc power supply starting to charge the ignition coil at a fixed crank angle of the engine.

2. A combustion monitoring apparatus as set forth in claim 1, wherein said voltage supply circuit includes an ac voltage supply circuit applying an ac voltage across the plug electrodes, the ac voltage supply circuit being actuated after the discharge duration for analyzing the combustion condition of the engine after the spark is developed by the spark plug.

3. A combustion monitoring apparatus as set forth in claim 1, wherein said combustion condition analyzing circuit compares a maximum value of the combustion ion signal over a given period of time following the discharge duration with a preselected reference value and determines that a complete misfire has occurred when the maximum value is smaller than the preselected reference value.

4. A combustion monitoring apparatus as set forth in claim 1, wherein said combustion condition analyzing circuit determines a decay time required for the combustion ion signal to reach a given decay value from the end of the discharge duration and determines that a misfire caused by blowout of a flame has occurred when the decay time is smaller than a given reference time.

5. A combustion monitoring apparatus as set forth in claims 1, wherein said combustion condition analyzing circuit determines a decay rate at which the combustion ion signal decays after the discharge duration and determines that combustion knock has occurred when the decay rate is smaller than a given reference decay rate.

6. A combustion monitoring apparatus as set forth in claim 1, wherein said ion current monitoring circuit includes a current detecting circuit detecting a current flowing through the plug electrodes and a current waveform detecting circuit detecting a variation in waveform of the current detected by the current detecting circuit caused by the variation in amount of combustion ions existing between the plug electrodes during an operation of said ac voltage supply circuit to provide a signal indicative of the detected variation in waveform of as the combustion ion signal.

7. A combustion monitoring apparatus as set forth in claim 6, wherein the current waveform detecting circuit includes a current detection control circuit controlling the current detecting circuit so as to detect the current flowing through the plug electrodes in a preselected phase relation to the ac voltage to provide the detected current as the combustion ion signal.

* * * * *